United States Patent [19]

Ueki et al.

[11] Patent Number: 4,983,435
[45] Date of Patent: Jan. 8, 1991

[54] ADHESIVES

[75] Inventors: Toru Ueki; Hajime Sentoku, both of Kanagawa; Takashi Miyazaki, Tokyo; Eiichi Sugihara, Kanagawa, all of Japan

[73] Assignee: Mitsui Toatsu Chemicals, Inc., Tokyo, Japan

[21] Appl. No.: 266,643

[22] Filed: Oct. 31, 1988

[30] Foreign Application Priority Data

Aug. 10, 1988 [JP] Japan ................................. 63-197864

[51] Int. Cl.$^5$ ...................... B32B 1/02; B32B 27/28; C08L 51/06; C08L 23/10
[52] U.S. Cl. .................... 428/36.6; 428/516; 525/74; 525/78
[58] Field of Search ................... 525/74, 78; 428/36.6, 428/516

[56] References Cited

U.S. PATENT DOCUMENTS 4,198,327  4/1980  Matsumoto et al. ................. 525/78

FOREIGN PATENT DOCUMENTS 61-062544  3/1986  Japan .
2118951  11/1983  United Kingdom .

Primary Examiner—Carman J. Seccuro
Attorney, Agent, or Firm—Burns, Doane, Swecker & Mathis

[57] ABSTRACT

As an adhesive used between a polypropylene layer and an ethylene/vinyl alcohol copolymer layer, there is provided an adhesive composition that comprises 98.9 to 59.9% by weight of a modified polypropylene (A) partly or fully grafted with an unsaturated carboxylic acid or its derivative, 1.0 to 40% by weight of an ethylene/α-olefin copolymer (B) having a density of 0.915 to 0.940 g/cc, and a melting point of 115° to 130° C., and 0.1% by weight or more but less than 3% by weight of a hydrocarbon type synthetic elastomer (C).

4 Claims, No Drawings

ADHESIVES

BACKGROUND OF THE INVENTION

The present invention relates to an adhesive between a polypropylene layer and an ethylene/vinyl alcohol copolymer layer.

PRIOR ART

A resin with a low water vapor permeability and oxygen permeability is called for as a packaging material for foods and pharmaceutical preparations.

As for resins with a low water vapor permeability, resins having no polar groups such as polyolefins, for example polyethylene and polypropylene are excellent. However, the resins having no polar groups have the disadvantage that the oxygen permeability is high to allow the contents in the packaging material made of such resins to be liable to be denatured.

On the other hand, as for resins with a low oxygen permeability, resins having polar groups such as ethylene/vinyl alcohol copolymer are excellent. However, the resins having polar groups have the disadvantage that the water vapor permeability is high.

Therefore, polyolefin is used in combination with a resin having a low oxygen permeability such as ethylene/vinyl alcohol copolymer thereby forming a laminate. Among others, a laminate made of a combination of polypropylene and ethylene/vinyl alcohol copolymer is low in the water vapor permeability and oxygen permeability as well as excellent in transparency and rigidity, and it is considered most preferable for a packaging material and a container for foods and pharmaceutical preparations.

Incidentally, polypropylene is poor in affinity for resins having polar groups such as ethylene/vinyl alcohol copolymer, and cannot be adhered to such resins by the usual molding method. Therefore, attempts were made to use, as an adhesive for bonding a polypropylene layer and an ethylene/vinyl alcohol copolymer layer, a modified-polypropylene grafted with an unsaturated carboxylic acid or its derivatives (e.g., U.S. Pat. Nos. 3,931,449, 3,932,692 and 3,868,433). As means of enhancing the adhesion strength between polypropylene and ethylene/vinyl alcohol copolymer, there have been proposed a method wherein a low density polyethylene is added to the modified-polypropylene grafted with an unsaturated carboxylic acid or its derivatives (e.g., U.S. Pat. No. 4,058,647), and a method wherein an ethylene polymer polymerized by the moderate-pressure process or low-pressure process is added to the modified-polypropylene grafted with an unsaturated carboxylic acid or its derivatives to enhance the adhesion strength (e.g., Japanese Patent Publication No. 36586/1984).

However, in the method wherein a low-density polyethylene is added to the modified-polypropylene, even if a usual low-density polyethylene, that is, a polyethylene polymerized by the so-called high-pressure process is added to the modified polypropylene, the adhesion strength of the adhesive cannot be increased enough, whereas according to a method wherein an ethylene polymer polymerized by the low-pressure or moderate-pressure process is added to the modified polypropylene to increase the adhesion strength of the adhesive, the adhesion strength between a polypropylene layer and an ethylene/vinyl alcohol copolymer layer is enhanced to a certain extent.

However, when the adhesive layer is made thin, then if the laminated sheet is fabricated, viz., if the laminated sheet is pressure-formed, or vacuum-formed, or if the laminated sheet is used under severe conditions, the adhesion strength was insufficient. When there was not enough adhesion strength, then if the laminated sheet is used as a packaging material, delamination occurs in part where the adhesion strength is low, resulting in sometimes defectives that allow large amounts of water vapor and oxygen to permeate therethrough.

To prevent the adhesion strength from lowering remarkably when the laminated sheet is fabricated, methods have been suggested wherein 3 to 20% by weight of a hydrocarbon type synthetic elastomer are further added to the modified-polypropylene partially or fully grafted with an unsaturated carboxylic acid or its derivative (e.g., U.S. Pat. No. 4,198,327).

In these methods, although the adhesion strength was enough at room temperatures, when a multi-layer bottle of the laminated polypropylene and ethylene/vinyl alcohol copolymer produced by using such an adhesive was loaded with a liquid having a high temperature, and then a force, for example, for tightening a screw type cap, was applied to the bottle at a high temperature, it was accompanied by such a problem that the heat resistance of the layer of the adhesive became insufficient, and the adhesive layer and the polypropylene layer and/or the ethylene/vinyl alcohol copolymer layer were separated. When the force for tightening the screw type cap is lowered, the separation would not take place, but in the case of a bottle of polypropylene, if the screw type cap was not tightened with a force of a torque of 30 kg or over at at least 80° C., the sealing was not sufficient, often leading to corruption of the contents.

SUMMARY OF THE INVENTION

Therefore, the object of the present invention is to provide an adhesive that is high in adhesion strength and can form an adhesive layer having a good heat resistance without allowing a polypropylene layer and an ethylene/vinyl alcohol copolymer layer to separate at a high temperature.

The inventors have studied diligently to solve the above problems, and have found that in producing a laminate by bonding polypropylene and ethylene/vinyl alcohol copolymer, when the modified polypropylene and an ethylene/α-olefin copolymer having a specified melting point and a specified density are incorporated into a specific amount of a hydrocarbon type synthetic elastomer, an adhesive having a high adhesion strength between a polypropylene layer and an ethylene/vinyl alcohol copolymer layer even at a high temperature can be obtained, leading to the present invention.

Therefore, according to the present invention there is provided an adhesive used between a polypropylene layer and an ethylene/vinyl alcohol copolymer layer, which adhesive comprises (A) 98.9 to 59.9% by weight of a modified-polypropylene partly or fully grafted with an unsaturated carboxylic acid or its derivative, (B) 1.0 to 40% by weight of an ethylene/α-olefin copolymer having a density of 0.915 to 0.940 g/cc, and a melting point of 115° to 130° C., and (C) 0.1% by weight or more but less than 3% by weight of a hydrocarbon type synthetic elastomer.

DETAILED DESCRIPTION OF THE INVENTION

As for the modified-polypropylene partly or fully grafted with an unsaturated carboxylic acid or its derivative that will be used as the component (A) in the present invention, the modified-polypropylene conventionally used as an adhesive layer between a polypropylene layer and an ethylene/vinyl alcohol copolymer layer may be used without any problems (e.g., Japanese Patent Publication No. 43045/1984).

The polypropylene for the raw material of the modified-polypropylene used in the component (A) may be homopolymer of propylene, or copolymers of propylene with other $\alpha$-olefin such as ethylene, 1-butene, 3-methylbutene-1, 1-hexene, and 4-methylpentene-1.

The unsaturated carboxylic acid or its derivative used for modifying polypropylene includes, for example acrylic acid, methacrylic acid, maleic acid, fumaric acid, itaconic acid, maleic anhydride, citraconic anhydride, itaconic anhydride, methyl acrylate, ethyl methacrylate, butyl methacrylate, glycidyl acrylate, glycidyl methacrylate, maleic acid monoethyl ester, maleic acid diethyl ester, fumaric acid monomethyl ester, itaconic acid diethyl ester, acrylic amide, maleic monoamide, maleic diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N,N-dibutylamide, maleimide, N-butylmaleimide, N-phenylmaleimide, sodium acrylate, potassium acrylate, sodium methacrylate, and potassium methacrylate, and particularly, maleic anhydride is preferable.

The content of said unsaturated carboxylic acid or its derivative that will be used for modifying the polypropylene is preferably $10^{-4}$ to 5% by weight, and it is also possible to prepare a master resin of a modified-polypropylene having the content of the unsaturated carboxylic acid or its derivative to be 0.01 to 60% by weight, and to dilute the master resin suitably with an unmodified polypropylene thereby using it as the modified-polypropylene. The polypropylene to be used for the dilution may be or may not be the same as the raw material polypropylene for the modified-polypropylene. In the latter the fluidity of the adhesive composition when melted may be desirably adjusted to be made equal to that of the polypropylene layer to be adhered by using a polypropylene different from the raw material polypropylene for the modified-polypropylene such as an ethylene/propylene copolymer having an ethylene content of 1.0 to 7.0% by weight.

The content of the modified polypropylene is preferably in the range of 98.9 to 59.9% by weight of the adhesive composition. If the content is less than 59.9% by weight, the adhesion strength to the polypropylene is low.

As the ethylene/$\alpha$-olefin copolymer used as the component (B) in the present invention, one having a density of 0.915 to 0.940 g/cc and a melting point of 115° to 130° C. may be used. If an ethylene/$\alpha$-olefin copolymer having a density range falling outside the above range, for example, a usual low density polyethylene obtained by polymerization using the high pressure process or a high-density polyethylene having a density of more than 0.94 g/cc is used, a high adhesion strength can not be secured. Particularly, one having a melt index (hereinafter referred to as MI) of 0.2 to 4.0 is preferable.

As an $\alpha$-olefin monomer copolymerized with ethylene, preferably use is made, for example, of propylene, 1-butene, 1-pentene, 1-hexene, 1-heptene, 1-octene, 3-methylbutene-1, and 4-methylpentene-1 and particularly, 1-hexene, 1-octene and 4-methylpentene are preferable. The copolymer is, generally, produced in the presence of a catalyst that can give high stereoregularity of ethylene.

The amount of the ethylene/$\alpha$-olefin copolymer of the component (B) is preferably 1.0 to 40% by weight of the adhesive composition, and if the amount is less than 1.0% by weight, the adhesion strength to the ethylene/vinyl alcohol copolymer layer is insufficient. If the amount is over 40% by weight, the adhesion strength to the polypropylene layer lowers.

The hydrocarbon type synthetic elastomer used as the component (C) in the present invention includes ethylene/propylene rubber (EPM), ethylene/propylene/diene copolymer (EPDM), acrylonitrile/styrene rubber, ethylene-1/butene rubber, butyl rubber, butadiene rubber, styrene/butadiene rubber (SBR), ethylene/butadiene rubber (EBR), isobutyrene rubber chloroprene rubber, chlorinated polyethylene, and chlorinated polypropylene. Among others, ethylene/propylene rubber (EPM), and ethylene/propylene/butadiene copolymer (EPDM) are preferable.

The content of the hydrocarbon type synthetic elastomer is in the range of up to 0.1% to less than 3% by weight of the adhesive composition. The adhesive having a content of over 3% by weight has a adhesion strength at room temperature, but is poor in heat resistance, and it is not suitable to produce for example a container that will be subjected to a force at a high temperature. If the content is less than 0.1% by weight, the adhesion strength at room temperatures is insufficient.

To the adhesive of the present invention, may be added, if required, other resins or additives, for example, resins such as usual intermediate-density and low-density polyethylenes, high-density polyethylene, ethylene/vinyl alcohol copolymer, and nylon, antioxidants, ultraviolet absorbers, pigments, dyes, fillers, nucleating agents, anti-blocking agents, slip agents, antistatic agents, and flame retarders in suitable amounts in the range that would not lower conspicuously the adhesion strength and the heat resistance of the adhesive. Particularly, in the case wherein the adhesive is melted and extruded through for example an extruder, it is preferable to substitute a high pressure-processed polyethylene having a density of 0.915 to 0.935 and a melting point of 105° to 120° C. for 50% by weight or less of the ethylene/$\alpha$-olefin copolymer of the component (B) because the adhesive can be prevented from adhering to the screw of the extruder thereby allowing the extruder to be operated continuously for a longer period stably. Herein, the term "high pressure processed polyethylene" means the so-called low-density polyethylene obtained by the radical polymerization.

The method of preparing the present adhesive composition includes various known methods, for example, a method wherein the above components are mixed, for example, in a ribbon blender, a V-type blender, a tumbler, or a Henschel mixer, and then are melted and kneaded by an extruder, a Banbury mixer, two rolls or a kneader, and a method wherein the above components are dissolved in a solvent, the mixture is well stirred, and then a bad solvent is added to deposit the components.

There is no particular limit on the polypropylene layer and the ethylene/vinyl alcohol copolymer layer to which the present adhesive is applied, and generally known polypropylene layers and ethylene/vinyl alcohol copolymer layers can be used. These layers may contain, if required, known additives such as antioxidants, ultraviolet absorbers, pigments, dyes, fillers, nucleating agents, anti-blocking agents, slip agents, antistatic agents, and flame retarders. Also, the polypropylene layer may contain scraps of the laminate wherein the present adhesive is used.

The method of producing a laminate by using the present adhesive includes a method wherein respective films or sheets of the polypropylene, the ethylene/vinyl alcohol copolymer and the adhesive are previously produced, and the adhesive is placed between the other resin films or sheets, and they are bonded thermally by pressing, a method wherein the adhesive that has been melted is extruded onto the film or sheet of one of the polypropylene and the ethylene/vinyl alcohol copolymer, and the film or sheet of the other resin is placed thereon, and a method wherein the polypropylene, the ethylene/vinyl alcohol copolymer, and the adhesive are melted in an extruder and are co-extruded via a single die to produce a sheet, a film or a bottle. The extrusion temperature at which the polypropylene and the ethylene/vinyl alcohol copolymer are extruded may be the conventional extrusion temperature. It is suitable that the extrusion temperature for the adhesive is generally 190° to 300° C., preferably 200° to 280° C.

Preferably, the thickness of the adhesive layer is in the range of 0.005 to 0.1 mm. If the thickness is less than 0.005 mm, the adhesion strength obtained is insufficient. If the thickness is increased to 0.1 mm or over, the adhesion strength cannot be enhanced.

The configuration of the laminate to which the present adhesive can be applied may be varied, for example, the laminate may be in the shape of a film, a sheet, a pipe, a corrugated plate, and a container such as a bottle that will be produced by injection molding or blow molding, and it is also possible that a laminated sheet is first produced, and the laminated sheet can be formed into various containers or the like by, for example, vacuum forming or pressure forming. The present invention is particularly preferable for a container that will be loaded, for example, with a liquid having a high temperature, and will be closed with a screw type cap.

EXAMPLES

The present invention will further be described with reference to examples below.

The adhesion strength was measured in accordance with JIS K-6854 (T-type separating test), the melting points of the ethylene/α-olefin copolymer and the polyethylene were determined from the maximum endotherms in the endothermic process measured by the differential scanning calorimetry (the temperature rise was 10° C./min), and the MI of the ethylene/α-olefin copolymer, the polyethylene, the ethylene/vinyl alcohol copolymer, and the hydrocarbon type synthetic elastomer, and the densities of the ethylene/α-olefin copolymer, the hydrocarbon synthetic elastomer, and the polyethylene were measured in accordance with JIS K-6760.

EXAMPLES 1 AND 2

2% by weight of a product (hereinafter abbreviated to GPP) obtained by grafting 100 parts by weight of a homopolypropylene (MI=0.7) with 15 parts by weight of maleic anhydride, 88.3% by weight of an ethylene/propylene random copolymer (having an ethylene content of 5% and MI=1.5, hereinafter abbreviated to PP for dilution), 1.0% by weight of an ethylene/propylene rubber (having a density of 0.86 g/cc, and MI=1.0, hereinafter abbreviated to EPM) as a hydrocarbon type synthetic elastomer, and 8.7% by weight of an ethylene/1-octene copolymer (having a melting point of 126° C., a density of 0.930 g/cc, and MI=2.5) were mixed by a Henschel mixer, and then were extruded through a 30-mm extruder to obtain pellets of an adhesive. Separately, 2% by weight of GPP, 79.6% by weight of PP for dilution, 1.0% by weight of EPM, and 17.4% by weight of an ethylene/1-octene copolymer (having a melting point of 126° C., a density of 0.930 g/cc, and MI=2.5) were mixed by a Henschel mixer, and then were extruded through a 30-mm extruder to obtain pellets of an adhesive.

Each of the adhesives, a polypropylene "Mitsui NOBLEN MJS-G" (trade name, manufactured by Mitsui Toatsu Chemicals, Inc., MI=1.0), and an ethylene/vinyl alcohol copolymer "EVAL F" (trade name, Kuraray Co., Ltd., MI=1.3) were used to produce each 500-ml screwed bottle (whose mouth section had an outer diameter of 22 mm and an inner diameter of 20 mm) having five layers, that is, a polypropylene layer, an adhesive layer, an ethylene/vinyl alcohol copolymer layer, an adhesive layer, and a polypropylene layer by using a multi-layer blow die. To the feed block, the polypropylene was fed by a 40-mm extruder, each of the adhesives was fed by a 30-mm extruder, and the ethylene/vinyl alcohol copolymer was fed by another 30-mm extruder. The thicknesses of the layers were 0.40 mm, 0.02 mm, 0.02 mm, 0.02 mm and 0.40 mm respectively. The extrusion temperature was 210° C. for the polypropylene, the adhesives and the ethylene/vinyl alcohol copolymer. Each of the bottles was filled with 500 ml of hot water having a temperature of 80° C., a screw type cap was attached to each bottle, and although the bottle was closed with a force of a torque of 30 kg, the heat resistance of each of the adhesives was enough, and the adhesive layer and the polypropylene layer or/and the ethylene/vinyl alcohol copolymer layer did not separate. The composition, the heat resistance, and the adhesion strength of each of the adhesives is shown in Table 1.

EXAMPLE 3

Example 1 was repeated, except that the amount of EPM was 0.5% by weight, 12.0% by weight of an ethylene/1-hexene copolymer (having a melting point of 122° C., a density of 0.920 g/cc, and MI=3.5) were used instead of the ethylene/1-octene copolymer, and PP for dilution was used in an amount of 85.5% by weight, thereby producing a multi-layered bottle. This adhesive also had an enough adhesion strength, and a heat resistance. The composition, the heat resistance and the adhesion strength of the adhesive are shown in Table 1.

EXAMPLES 4 AND 5

The procedure followed was as indicated in Examples 1 and 2, except that 2.0% by weight of an ethylene/propylene/diene copolymer (having a density of 0.86 g/cc, and MI=0.8, hereinafter abbreviated to EPDM) was used as the hydrocarbon type synthetic elastomer, and the contents of PP for dilution were 87.3 and 78.6% by weight, thereby producing multi-layered bottles. The composition, the heat resistance and the adhesion strength of each of the adhesives are shown in Table 1.

EXAMPLE 6

Example 4 was repeated, except that the content of PP for dilution was 80.3%, and 7.0% by weight of a polyethylene (having a melting point of 108° C., a density of 0.922 g/cc, and MI=6.0). The adhesive had an enough adhesion strength and an enough heat resistance. The adhesive did not adhere to the screw of the extruder through which the adhesive was extruded. The composition, the heat resistance and the adhesion strength of the adhesive are shown in Table 1.

COMPARATIVE EXAMPLES 1, 2 AND 3

Instead of the ethylene/1-octene copolymer (having a melting point of 126° C., a density of 0.930, and MI=2.5) used in Example 2, various ethylene polymers, and an ethylene copolymer that were outside the scope of the present invention were used.

Comparative Example 1: an ethylene/propylene copolymer having a density of 0.946, a melting point of 135° C. and MI=1.1.

Comparative Example 2: a high pressure processed polyethylene having a density of 0.930, a melting point of 109° C., and MI=4.0.

Comparative Example 3: a high-density polyethylene having a density of 0.958, a melting point of 133° C., and MI=1.0.

Multi-layered bottles were produced in the same manner as in Example 2.

The assessment of the adhesion strength, and the heat resistance of the obtained multi-layered bottles are shown in Table 1.

The adhesion strength at room temperature was very low in any of the cases compared with Example 2.

Since the adhesion strength at room temperatures is very low, before carrying out the heat resistance test the adhesive layer, and the polypropylene layer or/and the ethylene/vinyl alcohol copolymer layer separated, thereby assessment of the heat resistance test could not be done.

COMPARATIVE EXAMPLE 4

Example 1 was repeated, except that the hydrocarbon type synthetic elastomer was not added, and the contents of the ethylene/1-octene copolymer, and PP for dilution were 70% by weight and 28% by weight respectively, thereby producing multi-layered bottles. The composition, the heat resistance, and the adhesion strength of each of the adhesives are shown in Table 1.

Compared with Example 1, the adhesion strength was low, and the heat resistance of each of the adhesives could not be measured as in Comparative Examples 1 to 3.

COMPARATIVE EXAMPLE 5

Example 1 was repeated, except that the ethylene/1-octene copolymer was not added, the amount of EPM was 4.0% by weight, and the content of PP for dilution was 94% by weight, thereby producing a laminated sheet. The composition, the heat resistance and the adhesion strength of the adhesive are shown in Table 1.

Although there was no problem with respect to the adhesion strength at room temperatures, the heat resistance was poor, and when the bottle was loaded with 500 ml of hot water having a temperature of 80° C., a screw type cap was applied, and a force of a torque of 30 kg was applied to close the bottle, the adhesive layer, the polypropylene layer, and the ethylene/vinyl alcohol copolymer layer disadvantageously separated.

COMPARATIVE EXAMPLE 6

Example 5 was repeated, except that 20% by weight of EPDM were used, and 60.6% by weight of PP for dilution were used, thereby producing a multi-layered bottle. The composition, the heat resistance and the adhesion strength of the adhesive are shown in Table 1.

Although there was no problem with respect to the adhesion strength at room temperatures, similarly to Example 5 the heat resistance was poor and when a force is applied at a high temperature, the adhesive layer, the polypropylene layer and the ethylene/vinyl alcohol copolymer layer separated.

EFFECTS OF THE INVENTION

The present adhesive is good in the adhesion strength between a polypropylene layer and an ethylene/vinyl alcohol copolymer layer, and, for example, in producing a multilayered bottle from these resins, since the adhesion strength at high temperatures is high in comparison with the conventional adhesive resin, when the bottle is loaded with a liquid having a high temperature, and closed by screw type cap, separation between the polypropylene layer and the adhesive layer, and/or the ethylene/vinyl alcohol copolymer layer and the adhesive layer due to lack of the heat resistance would not take place. As a result, the laminate of the polypropylene/ethylene/vinyl alcohol copolymer that uses the present adhesive is low in water vapor permeability, and oxygen permeability, and the heat resistance of the laminate is not damaged.

TABLE 1

| | Ethylene/α-Olefin Copolymer | | | | Polyethylene | | | |
|---|---|---|---|---|---|---|---|---|
| Experiment No. | Melting point (°C.) | Density (g/cc) | MI (g/10 min) | Content (wt. %) | Melting point (°C.) | Density (g/cc) | MI (g/10 min) | Content (wt. %) |
| Example 1 | 126 | 0.930 | 2.5 | 8.7 | — | — | — | — |
| Example 2 | 126 | 0.930 | 2.5 | 17.4 | — | — | — | — |
| Example 3 | 122 | 0.920 | 3.5 | 12.0 | — | — | — | — |
| Example 4 | 126 | 0.930 | 2.5 | 8.7 | — | — | — | — |

TABLE 1-continued

Experimental Results

| Experiment No. | | | | | | | | |
|---|---|---|---|---|---|---|---|---|
| Example 5 | 126 | 0.930 | 2.5 | 17.4 | — | — | — | — |
| Example 6 | 126 | 0.930 | 2.5 | 8.7 | 108 | 0.922 | 6.0 | 7.0 |
| Compar. Ex. 1 | 135 | 0.946 | 1.1 | 17.4 | — | — | — | — |
| Compar. Ex. 2 | — | — | — | — | 109 | 0.923 | 4.0 | 17.4 |
| Compar. Ex. 3 | — | — | — | — | 133 | 0.958 | 1.0 | 17.4 |
| Compar. Ex. 4 | 126 | 0.930 | 2.5 | 70.0 | — | — | — | — |
| Compar. Ex. 5 | — | — | — | — | — | — | — | — |
| Compar. Ex. 6 | 126 | 0.930 | 2.5 | 17.4 | — | — | — | — |

| Experiment No. | Hydrocarbon Synthetic elastomer Content (wt. %) | Modified PP | | Adhesion strength (kg/cm) | Heat Resistance of Adhesive |
|---|---|---|---|---|---|
| | | GPP Content (wt. %) | PP for dilution Content (wt. %) | | |
| Example 1 | 1.0 | 2.0 | 88.3 | 1.3 | good |
| Example 2 | 1.0 | 2.0 | 79.6 | 1.5 | good |
| Example 3 | 0.5 | 2.0 | 85.5 | 1.2 | good |
| Example 4 | 2.0 | 2.0 | 87.5 | 1.7 | good |
| Example 5 | 2.0 | 2.0 | 78.6 | 1.6 | good |
| Example 6 | 2.0 | 2.0 | 80.3 | 1.5 | good |
| Compar. Ex. 1 | 1.0 | 2.0 | 79.6 | 0.3 | Adhesion strength was bad at room temperatures, and heat resistance test could not be done. |
| Compar. Ex. 2 | 1.0 | 2.0 | 79.6 | 0.3 | Adhesion strength was bad at room temperatures, and heat resistance test could not be done. |
| Compar. Ex. 3 | 1.0 | 2.0 | 79.6 | 0.2 | Adhesion strength was bad at room temperatures, and heat resistance test could not be done. |
| Compar. Ex. 4 | 0.0 | 2.0 | 28.0 | 0.1 | Adhesion strength was bad at room temperatures, and heat resistance test could not be done. |
| Compar. Ex. 5 | 4.0 | 2.0 | 94.0 | 1.1 | Layers separated |
| Compar. Ex. 6 | 20.0 | 2.0 | 60.6 | 1.6 | Layers separated |

What is claimed is:

1. An adhesive used between a polypropylene layer and an ethylene/vinyl alcohol copolymer layer, which adhesive comprises (A) 98.9 to 59.9% by weight of a modified polypropylene partly or fully grafted with an unsaturated carboxylic acid or its derivative, (B) 1.0 to 40% by weight of an ethylene/α-olefin copolymer having a density of 0.915 to 0.940 g/cc, and a melting point of 115° to 130° C., and (C) 0.1% by weight or more but less than 3% by weight of a hydrocarbon type synthetic elastomer.

2. An adhesive as claimed in claim 1, wherein the ehtylene/α-olefin copolymer of component (B) has a melt index of 0.2 to 4.0.

3. An adhesive as claimed in claim 1, wherein 50% by weight or less of the etheylene/α-olefin copolymer of component (B) are replaced with a high pressure-processed polyethylene having a density of 0.915 to 0.935 g/cc, and a melting point of 105° to 120° C.

4. An adhesive as claimed in claim 1, characterized in that said adhesive is used for the production of a multi-layered bottle that is made of a polypropylene layer and an ethylene/vinyl alcohol copolymer layer and of a type that will be loaded with a liquid having a high temperature, followed by tightening a cap to close the bottle.

* * * * *